(12) United States Patent
Viaud

(10) Patent No.: US 7,311,040 B2
(45) Date of Patent: Dec. 25, 2007

(54) CYLINDRICAL BALING PRESS

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/398,181

(22) Filed: Apr. 5, 2006

(65) Prior Publication Data

US 2006/0243143 A1   Nov. 2, 2006

(30) Foreign Application Priority Data

Apr. 9, 2005   (DE) .................. 10 2005 016 306

(51) Int. Cl.
*B30B 5/04* (2006.01)
(52) U.S. Cl. .................. 100/87; 100/88; 56/341
(58) Field of Classification Search .............. 100/87, 100/88, 89; 56/341, 344
See application file for complete search history.

(56) References Cited

U.S. PATENT DOCUMENTS 5,224,329 A * 7/1993 Viaud .................. 56/341
6,477,824 B2 * 11/2002 Preheim .................. 56/341
2004/0128971 A1 * 7/2004 Viaud .................. 56/341
2005/0198935 A1 * 9/2005 Johnson et al. ........... 56/341

FOREIGN PATENT DOCUMENTS

| DE | 196 09 926 | 9/1997 |
| DE | 102 23 417 | 12/2003 |
| EP | 1 520 466 | 4/2005 |

OTHER PUBLICATIONS

FMO, Fundamentals of Machine Operation, Hay And Forage Harvesting, 3 Pages.
German Search Report, Mar. 7, 2007, 4 Pages.

* cited by examiner

*Primary Examiner*—Jimmy T. Nguyen

(57) ABSTRACT

A cylindrical baling press including a roller around which a belt is arranged to partially surround a baling chamber. In the region of the roller, the belt relinquishes contact with a cylindrical bale being formed within the baling chamber. In this region of the roller, a lateral wall enclosing the pressing chamber is provided with a bulge or an opening, which makes it possible for material present in a space between two belt sections to be engaged by the rotating cylindrical bale and expelled through the opening or back into the bale. This configuration avoids, or at least reduces, the chance of jamming caused by crop materials around the roller.

3 Claims, 4 Drawing Sheets

CYLINDRICAL BALING PRESS

BACKGROUND

1. Field of the Invention

The present invention relates to a cylindrical baling press used in agriculture for the forming of cylindrical bales of harvested crop material. More specifically, it relates to an improvement that reduces jamming and tracking problems by freeing entrapped crop material from a belt of the baling press.

2. Description of Related Art

Cylindrical baling presses have a baling chamber enclosed by lateral walls, with the other surfaces being enclosed in part by one or more belts guided around rollers so as to form loops and an opening for crop material. At the locations where the belt(s) move away from the cylindrical bale, crop material tends to become entrapped within interior spaces of the loops. This can lead to problems with jamming and/or tracking of the belt(s). In the book "Fundamentals of machine operations, hay and forage harvesting", FMO 141B, D-00, p. 153, it is suggested that the lateral surfaces be left open. However, this solution is not effective until the baling process is nearly complete, at which point the risk of jamming and tracking problems is greatly reduced. In addition, this solution is most effective where the belt(s) are approaching the cylindrical bale, in which location the above problems rarely occur.

The present invention seeks to solve these issues by providing a general means to avoid accumulations of crop material in loops or between belt sections of a cylindrical baling press.

SUMMARY

The present invention provides a means by which crop material accumulated in a belt loop against a lateral wall, and engaged by peripheral surfaces of a rotating cylindrical bale, is removed from the interior space of the belt loop. The present invention is not limited to belts, but encompasses any tensile means which may surround a baling chamber.

According to one embodiment, the lateral wall includes an opening near a roller where crop material then accumulates. Removal occurs between a forward edge of the lateral wall opening and the space between the lateral wall and the roll. Crop material presses directly against an end face of the rotating cylindrical bale and is carried along by the bale and ejected through the opening.

In an alternate embodiment, a recess or outward bulge of the lateral wall, rather than an opening, is provided. As a result, the crop material will be fed to the end face of the cylindrical bale and be held adjacent to the end face until it becomes absorbed into the bale. The shape of the recess may be, for example, a wedge shape, which progressively approaches a peripheral surface, where the crop material is forced against the bale.

While most of the crop material is withdrawn from within the belt loop, not all of the crop material is necessarily fed to the end face of the cylindrical bale. To move all of the crop material to the end face, a conveying device may be provided to feed it back into the bale. The conveying device may be of an active type (for example screws, paddles, blowers, or the like) or may be passive (for example a chute or the like). Screw conveyors may convey in the axial direction or the tangential direction.

In addition, removed material may be re-fed into the bale by depositing the removed material onto the baler's intake and feed device. The intake and feed device is usually located below the opening or recess. This makes it simple for said crop material to be conveyed back into the baling process.

In order to successfully handle particularly tough, wet, and/or rigid crop material, a fragmenting device may also be provided near the end of the roller. This device will cut up long stalks and the like and enable them to be incorporated into the bale. The fragmenting device may be fixed to the roller itself, or may cooperate with the roller, for example, by means of blades on the roll and/or apart from the roll. Alternatively, chopping devices, rotary blades, or the like may be provided which are separately driven but which provide the same function.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

An exemplary embodiment of the present invention is illustrated in the drawings, which embodiment will be described in more detail hereinbelow.

DETAILED DESCRIPTION

Figure 1:
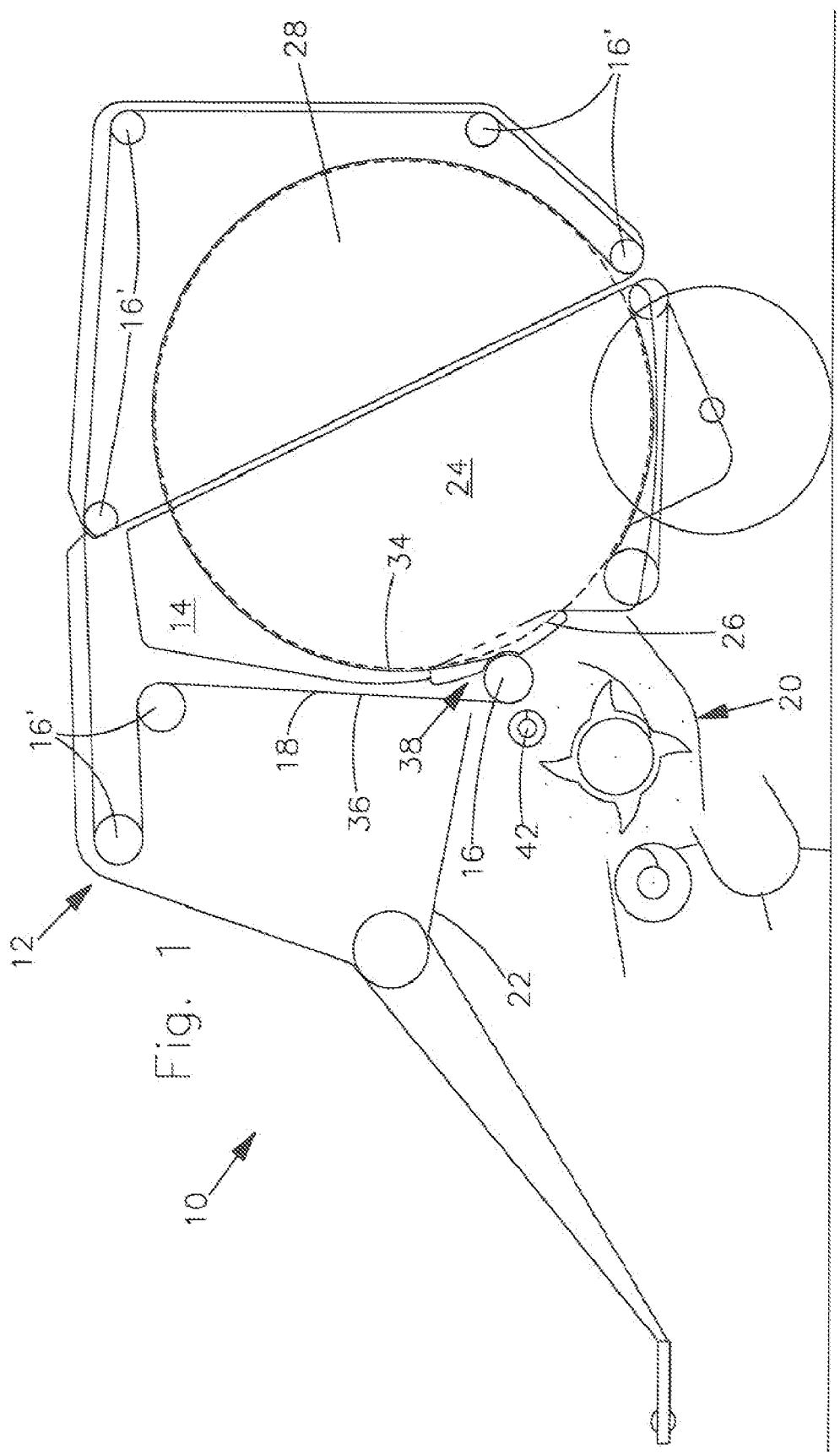
FIG. 1 is a side view of a cylindrical baling press according to the present invention.

A conventional, towed cylindrical baling press according to the present invention is illustrated in FIG. 1 and designated at 10. It includes a vehicle frame 12, laterally spaced walls 14, rollers 16 and 16', a bale-forming arrangement defined by one belt or a plurality of belts 18, an intake and feed device 20 and a baling chamber 24. The baling chamber 24 creates bales out of crop materials, for example, hay, straw, silage, or other crops. The baling chamber 24 is capable of varying in size, in a manner, not shown, but well known in the art, although other embodiments may have a baling chamber 24 with fixed dimensions. In the present embodiment, the size of the baling chamber 24 is varied by shifting the position of some of the rollers 16' in response to the size of a cylindrical bale 28 being formed within the baling chamber 24. In some embodiments, the baling press 10 may be industrial in scale and stationary, used, for example, to process wastes, wood, or any other material where forming into a bale may be useful for storage, transport or disposal.

Looking more closely at the vehicle chassis 12 of the towed embodiment shown in FIG. 1, it includes an axle with wheels, and a tow shaft for coupling it behind a tractor vehicle, for example, a farm tractor. The vehicle frame 12 also includes a framework 22 which supports lateral walls 14, the rollers 16 and 16' and other devices (not illustrated), such as holding, confining, and positioning and binding devices.

The lateral walls 14 are large enough to approximately cover the end faces of the baling chamber 24. Depending on the general configuration of the apparatus, the lateral walls 14 may be segmented parts of the vehicle chassis 12 or may be separate metal plates which cover the entire end face and may be movable or even controllable. Regardless of the configuration of the lateral walls 14, the walls 14 of the present invention include parallel sections. respectively disposed for engagement with a major area of opposite end faces of a cylindrical bale 28 contained in the baling chamber 24, and which each terminate at an open section 26 located behind and near an adjacent outboard end region of the roller 16. Each open section 26 of the walls 14 is configured to avoid contact with a minor area of the end face of a cylindrical bale 28 located behind and near the roller 16.

Figure 2:
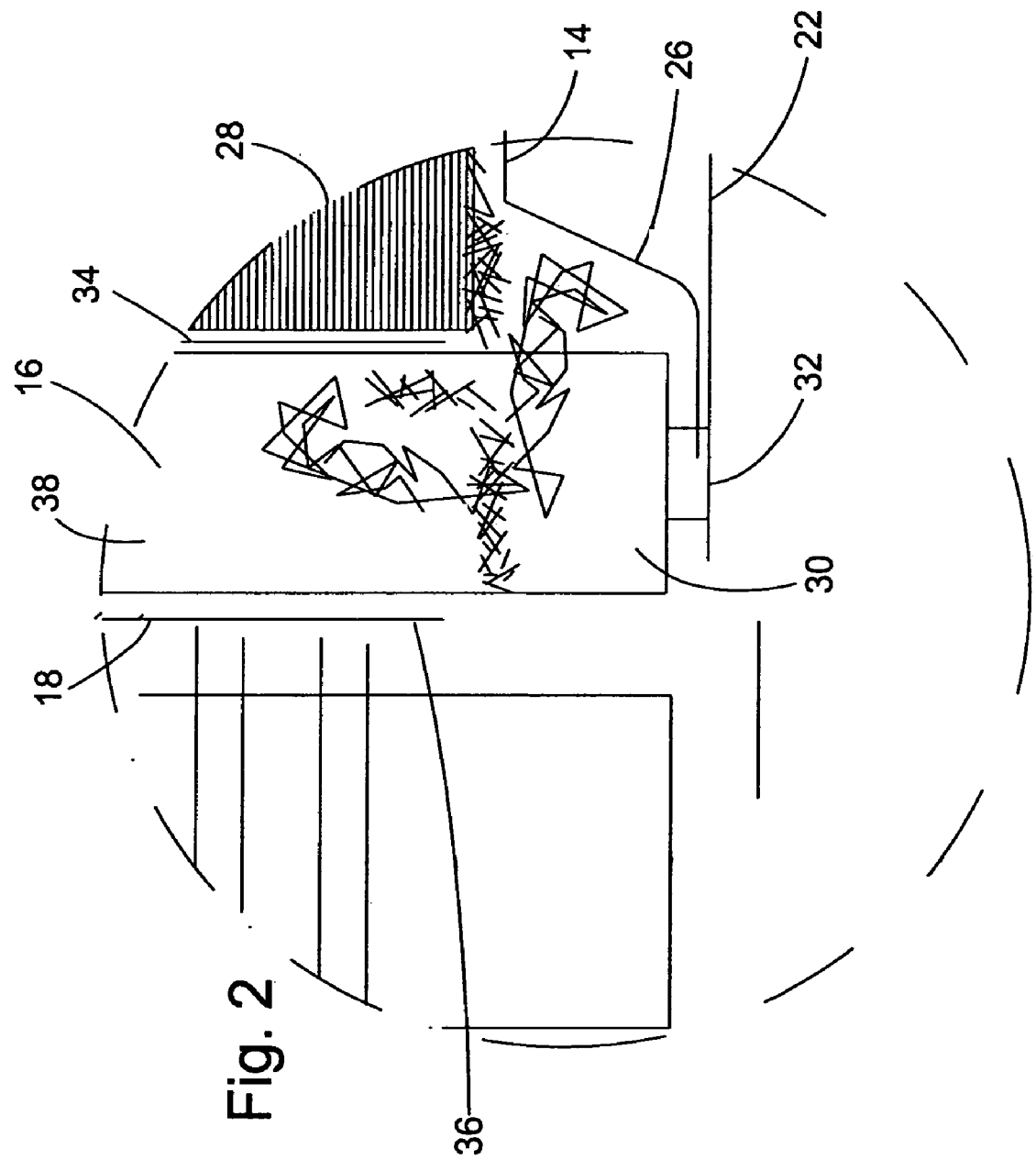
FIG. 2 is a top detail view of the baling press of FIG. 1 showing the end of a roller and a protruding section of a lateral wall.

The rollers 16 and 16' have various functions and therefore different design configurations, in general, all of the rollers 16 and 16' have a roller body 30. with the roller 16 and most of the rollers 16' being rotatably mounted to the framework 22 or lateral walls 14, by a shaft 32 (see FIG. 2). However, some of the rollers 16' are disposed on a stressing arm (not shown), configured to move the rollers 16', carried by the stressing arm and hold the belt or belts 18 under constant tension.

According to the present invention, the roller 16 is of primary significance. The roller 16 delineates an upper boundary of an entrance to the baling chamber 24 and is located such that, after being routed around the baling chamber 24, the belt, or belts 18 is, or are, guided over and partially around the roller 16 and up to an adjacent one of the other rollers 16'. Consequently, two belt sections 34 and 36 (see FIG. 2) are formed, when a bale 28 is located in the chamber 24, as shown, defining a space 38 in between having opposite ends in direct communication with the open sections 26. The roller 16 is arranged such that the belt section 34 embraces the outer circumferential surface of the cylindrical bale 28, during formation of the bale, while the belt section 36 follows a path spaced from the circumference of the bale 28. In the absence of the present invention, this would present the risk that the belt or belts 18 would carry away crop material and cause it to enter the space 38, leading to jamming of the rollers 16 and 16' and/or tracking problems with the belt or belts 18. In prior art arrangements not having open sections such as the sections 26, jamming regularly occurs near the end of the roller 16 toward the laterally spaced walls 14.

Figure 4:
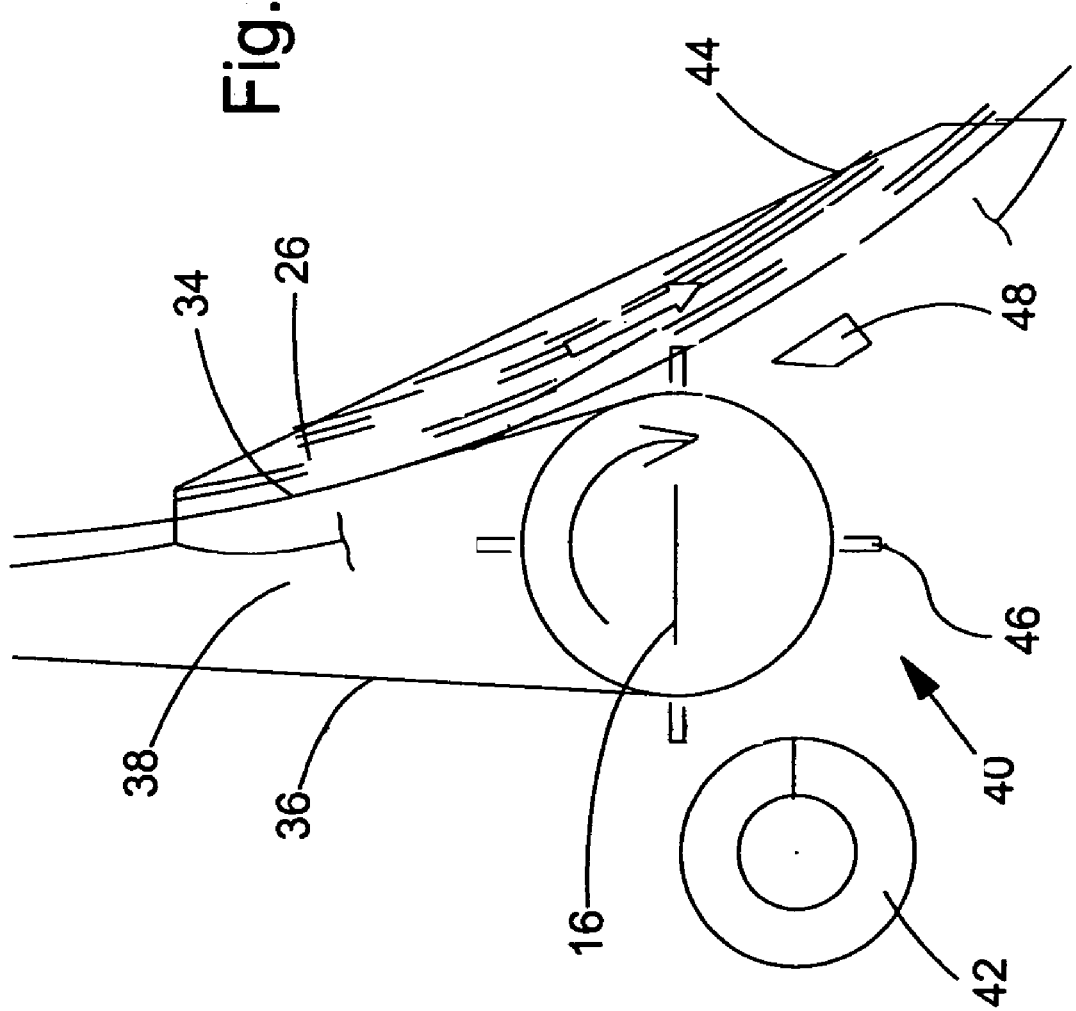
FIG. 4 is a side view of the roll of FIG. 2 of the cylindrical baling press showing a fragmenting device and an open section of the lateral wall.

The rollers 16 and 16' may have different lengths. However, at least the shaft 32 of the roller 16 extends laterally beyond the baling chamber 24. In FIG. 4, an embodiment is illustrated wherein the end region of the roller 16 includes a fragmenting device 40, described below in more detail.

As indicated above, the bale-forming arrangement may include but one a full-surfaced belt 18 which extends over nearly the entire width of the baling chamber 24. Alternatively, the bale-forming arrangement may configured as a plurality of the belts 18 arranged in parallel with a minimal separation between the belts such that nearly the entire width of the baling chamber 24 is covered (see FIG. 3). In either configuration, the bale-forming arrangement (belt or belts 18) is guided by the roller 16, redirected by approximately 180°, when a completed or nearly completed bale 28 is contained In the baling chamber 24.

At the beginning of the baling process the belt 18 contacts the roller 16 directly, because they extend from below the roller 16 to the side of the neighboring roller 16' adjacent to the baling chamber 24. Initially the baling chamber 24 is kept to a minimal size. Increasing resistance applied to a lower belt by a tensioning device (not shown) forms a dense bale. The belts 18 cannot extend fully to the lateral walls 14 and, if a plurality of belts 18 are employed, the belts 18 may even move away from the lateral walls 14. This creates the possibility that the crop material may leave the baling chamber 24 and enter the space 38. In addition, there is a risk that the crop material will penetrate in between the belts 18 and the respective rollers 16 and 16' and become trapped within the space 38. A conveying device 42 may also be provided (FIG. 3), near the roller 16.

The intake and feed device 20 is of a conventional design. It includes a pick-up and, in the embodiment illustrated, a rotor (which may be in the form of a crop cutting device) which conveys the pressed crop material from the pick-up into the baling chamber 24. The intake and feed device 20 is disposed below the tow roller 16 and, in the embodiment shown, is wider than the baling chamber 24.

Figure 3:
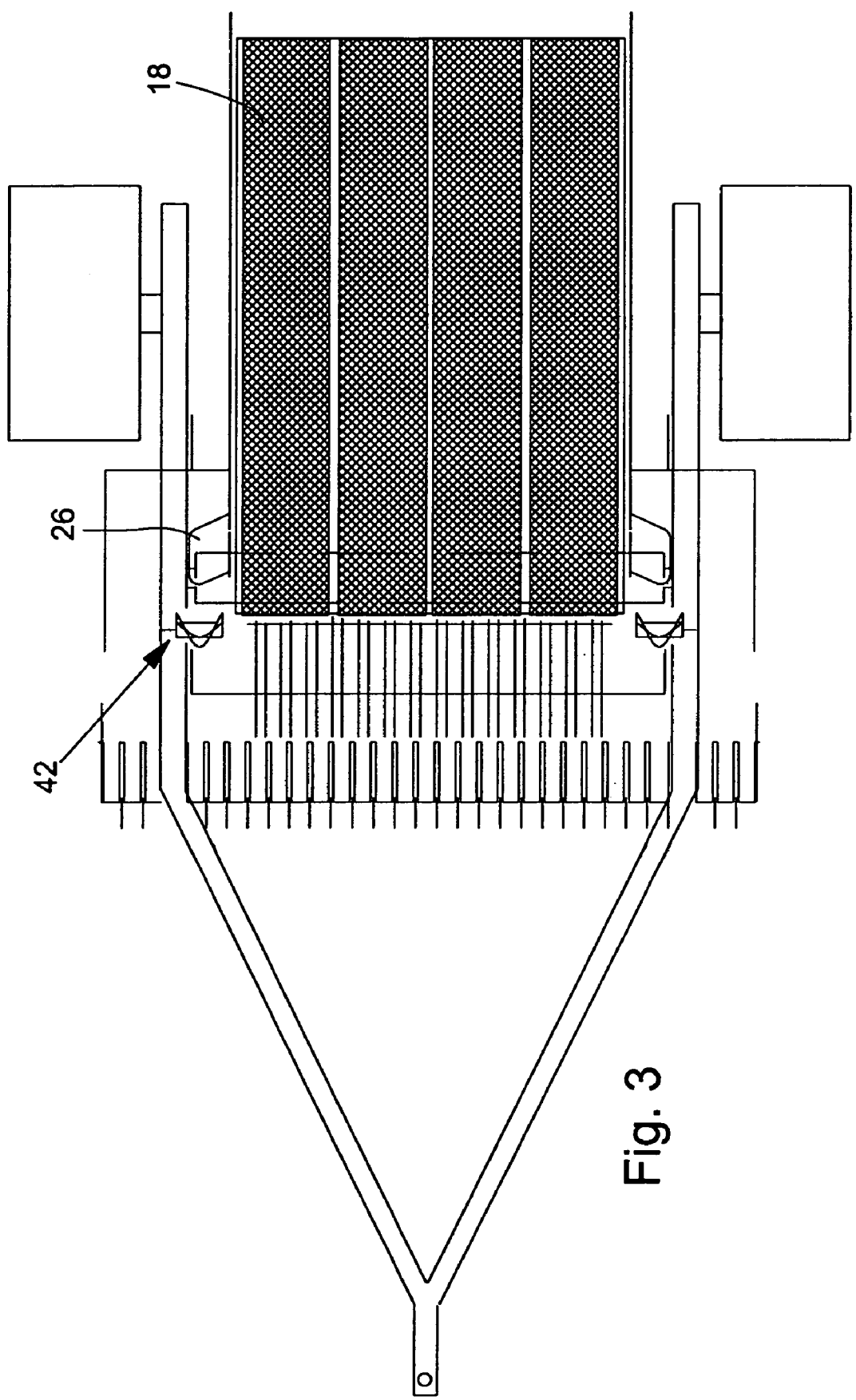
FIG. 3 is a top view of the cylindrical baling press of FIG. 1 showing a conveying device near the end of the roller.

The fragmenting device 40 (see FIG. 4) indudes cutters 46 (with cutting edges) which extend radiaily and are arranged in rows which run parallel to the axis of the roller body 30 at opposite end regions of the roller body which extend laterally beyond the bail-forming arrangement (belt or belts 18), as shown in FIG. 3. In the present embodiment, these cutters 46 are positioned relative to a cooperating cutter 48 to cut plant stalks and the like into smaller pieces. The cooperating cutter 48 may be mounted to either the framework 22 or the lateral walls 14. Instead of mounting the cutters 46 in rows which run parallel to the axis of the roller body 30, they may instead be arranged in rows which run at an angle to the axis or along a spiral or helical path.

The conveying device 42 is in the form of a screw conveyor driven, for example, by belts, a gear drive, electrical motor, or hydraulic motor. In other embodiments, the conveying device 42 may be undriven if configured to rotate by contacting the crops being fed into the baling chamber 24 by the intake and feed device 20. If the conveying device 42 is in the form of a screw conveyor (as shown in FIGS. 1 and 4), it moves the crop material along its axial length toward the center of the baling press 10. The conveying device 42 may be arranged to move crops on either its upper or lower side, depending on where the crops are to be deposited. For most applications, other than particularly difficult conditions, the conveying device 42 is not necessary.

As mentioned above, the open sections 26 are respectively located at forward edge locations of parallel sections of the lateral walls 14 and are respectively in communication with opposite ends of the space 38 and opposite ends of the roller 16 In the embodiment illustrated, each open section 26 is defined by an outwardly inclined minor section of the wall 14, and thus is configured as an outward a protrusion of the lateral wall 14 defining a rear boundary of an opening or space having an inner region, which when the bale 28 is located in the baling chamber 24, is disposed beside, and exposed to, a minor forward area of the end face of the bale 28. As viewed in horizontal section in FIG. 2. the is space is generally wedge-shaped, with the roller body 30 delimiting a forward side and the protrusion delimiting a rear side of the space, with a horizontal dimension of the space diminishing outwardly. Thus, the protrusion is arranged to extend away from the end face of the cylindrical bale 28 and the lateral wall 14 and is directed toward the end of the roller 16. The opening or space within the open section 26 permits the crop material trapped within the space 38, which is being moved or agitated by the belt 18, to be ejected either downward onto the intake and feed device 20 or be directed by the inclination of the protrusion into engagement with the end face of the cylindrical bale 28. The intake and feed device 20 conveys the crop material formerly trapped within the space 38 to be conveyed back into the chamber 24, where it is picked up by the cylindrical bale 28, preventing it from causing further problems or being wasted.

In an alternate embodiment (not shown), the open section 26 does not include the protrusion extending away from the lateral wall 14, but rather the wall just terminates so that no portion of the wall 14 exists outwardly of the minor area of the end face of the bale 28 when located in the baling chamber 24. In this embodiment, a forward edge 44 (see FIG. 4) of the lateral wall 14 is spaced rearward of the roller body 30 of the roller 16, which delineates the upper boundary of the entrance to the baling chamber 24. The edge 44 approximately subtends an arc defined by an outward projection of the circular surface formed by the side of the cylindrical bale 28, creating an open circular segment in the lateral wall 14. The shape of the opening need not be that of an arc; any shape suitable to allow entrapped crop material to escape the space 38 may be provided. In this embodiment, all crop material fed from the space 38 is ejected onto the intake and feed device 20 and returned to the baling chamber 24. In FIG. 4, the open section 26 is shown only in a partial view to show the edge 44 and illustrate the embodiment described above.

In an alternate embodiment (not shown), the open section 26 does not include the protrusion extending away from the lateral wall 14, but rather just includes the opening. In this embodiment, a forward edge 44 (see FIG. 4) of the lateral wall 14 extends through an arc across the circular surface formed by the side of the cylindrical bale 28, creating an open circular segment in the lateral wall 14. The shape of the opening need not be that of an arc; any shape suitable to allow entrapped crop material to escape the space 38 may be provided. In this embodiment, all crop material feed from the space 38 is ejected onto the intake and feed device 20 and returned to the baling chamber 24. In FIG. 4, the open section 26 is shown only in a partial view to show the edge 44 and illustrate the embodiment described above.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

What is claimed is:

1. A cylindrical baling press comprising:
    a frame including a framework supporting laterally spaced walls which partially enclose a baling chamber;
    a plurality of transversely extending belt support rollers including one roller located at an upper region of an entrance to said baling chamber;
    a bale-forming arrangement including at least one belt being guided around said belt support rollers so as to enclose said baling chamber in a region extending between said laterally spaced walls, with said one roller being located so as to guide a section of said at least one belt away from a cylindrical bale formed in the baling chamber; and
    said laterally spaced walls, which partially enclose said baling chamber, respectively including parallel portions engaged with opposite end faces of said cylindrical bale and terminating at forward edges, which went viewed from the side, substantially subtend an arc defined by a circumferential surface of said bale at a location adjacent said one roller thus creating a space overlapping and extending outwardly from a minor area of each of said end faces of said cylindrical bale adjacent to a respective end of said one roller, with said laterally spaced walls each including a portion defined by a protrusion joined to, and inclined outwardly from, the forward edge of the portion of said side wall engaged with the end face of said bale.

2. The cylindrical baling press according to claim 1, further comprising a conveying device located near, and forward of, where said at least one belt is engaged with said one roller.

3. The cylindrical baling press according to claim 1, wherein said one roller has opposite end regions extending laterally beyond said bale-forming arrangement, and further comprising a fragmenting device mounted on at least one of said opposite end regions of said one roller.

* * * * *